US012720573B2

(12) United States Patent
Zhao

(10) Patent No.: US 12,720,573 B2
(45) Date of Patent: Aug. 25, 2026

(54) RESOURCE SELECTION METHOD AND DEVICE BASED ON INTER-TERMINAL ASSISTANCE MECHANISM

(71) Applicant: Beijing Xiaomi Mobile Software Co., Ltd., Beijing (CN)

(72) Inventor: Wensu Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 294 days.

(21) Appl. No.: 18/574,983

(22) PCT Filed: Jun. 29, 2021

(86) PCT No.: PCT/CN2021/102892
§ 371 (c)(1),
(2) Date: Dec. 28, 2023

(87) PCT Pub. No.: WO2023/272458
PCT Pub. Date: Jan. 5, 2023

(65) Prior Publication Data

US 2025/0031222 A1 Jan. 23, 2025

(51) Int. Cl.
*H04W 72/25* (2023.01)
*H04L 5/00* (2006.01)
(Continued)

(52) U.S. Cl.
CPC ........... *H04W 72/25* (2023.01); *H04L 5/0055* (2013.01); *H04W 72/02* (2013.01); *H04L 1/1812* (2013.01)

(58) Field of Classification Search
CPC .... H04W 72/25; H04W 72/02; H04L 5/0055; H04L 1/1812
(Continued)

(56) References Cited

U.S. PATENT DOCUMENTS

2020/0374861 A1 11/2020 Shilov et al.
2021/0045178 A1* 2/2021 Kung .................... H04W 76/18
(Continued)

FOREIGN PATENT DOCUMENTS

CN 110178408 A 8/2019
CN 112385251 A 2/2021
(Continued)

OTHER PUBLICATIONS

International Search Report Issued Mar. 28, 2022, in PCT/CN2021/102892, filed on Jun. 29, 2021, 4 pages, with English Translation.
(Continued)

*Primary Examiner* — Faisal Choudhury
(74) *Attorney, Agent, or Firm* — Oblon, McClelland, Maier & Neustadt, L.L.P.

(57) ABSTRACT

The present disclosure relates to a resource selection method and device based on inter-terminal assistance mechanism. When the resource selection method is applied to a first terminal, the method includes: receiving a TB from a second terminal, in response to determining that the TB is successfully received and determining that there is an unused reserved resource indicated by SCI carried in the TB by the second terminal, determining an unused reserved resource set based on the unused reserved resource, and performing a resource selection based on inter-terminal assistance mechanism according to the unused reserved resource set.

8 Claims, 9 Drawing Sheets

(51) Int. Cl.
*H04W 72/02* (2009.01)
*H04L 1/1812* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2023/0123147 | A1* | 4/2023 | Hwang | H04W 72/02 370/329 |
| 2023/0126112 | A1* | 4/2023 | Lin | H04W 72/02 370/329 |
| 2023/0131345 | A1* | 4/2023 | Lin | H04L 1/1812 370/329 |
| 2023/0180216 | A1* | 6/2023 | Hwang | H04W 72/1263 370/329 |

FOREIGN PATENT DOCUMENTS

| | | | |
|---|---|---|---|
| CN | 112399487 | A | 2/2021 |
| CN | 112867176 | A | 5/2021 |
| WO | WO 2020/243966 | A1 | 12/2020 |
| WO | WO 2020/257995 | A1 | 12/2020 |
| WO | WO 2021/035580 | A1 | 3/2021 |
| WO | WO 2021/062774 | A1 | 4/2021 |

OTHER PUBLICATIONS

Chinese office Action Issued Aug. 17, 2023, in CN 202180001932. 6, 16 pages, with English Translation.

Fujitsu. "Discussion on Reservation and Sensing based Resource Selection Methods for NR-V2X Sidelink Communication", 3GPP TSG RAN WG1 #97 RI-1906439, May 17, 2019, 7 pages.

* cited by examiner

RESOURCE SELECTION METHOD AND DEVICE BASED ON INTER-TERMINAL ASSISTANCE MECHANISM

CROSS-REFERENCE TO RELATED APPLICATIONS

The present application is a U.S. National Stage of International Application No. PCT/CN2021/102892 filed on Jun. 29, 2021, the entire contents of which are incorporated herein by reference for all purposes.

BACKGROUND

Technical Field

The present disclosure relates to the field of communication technology, and in particular, to a resource selection method and device based on inter-terminal assistance mechanism, and a storage medium.

Description of the Related Art

Since the Long Term Evolution (LTE), the Third Generation Partnership (3GPP) has been developing the sidelink standard as a standard for direct end-to-end communications. In July 2020, the first standard for New Radio (NR) sidelink was completed in the Release 16, in which the NR sidelink solution is focused on Vehicle to Everything (V2X) and public safety. For the V2X and public safety, due to time constraints, the Release16 does not fully support service requirements and operation schemes, and the Service and System Aspect (SA) is enhanced to some extent in the Release 17, for example, architectural enhancements and system enhancements for 3GPP supporting advanced V2X services. In addition, the SA working group is investigating other business use cases related to NR sidelink, for example, interactive services for network control, enhanced energy efficiency relays, wide coverage, audiovisual service production. Therefore, in the 86th plenary of 3GPP, the NR sidelink enhancement was included as a work item of the Release 17, with the objective of enhancing the reliability of sidelink transmission and reducing the latency.

In the NR sidelink enhancement, a resource reservation mechanism is used to reserve a resource for retransmission of transport block (TB) to improve transmission reliability. That is, for each transmission of the TB, a resource for next transmission of the TB is reserved. Resources are reserved for at most two retransmissions of the TB at one transmission of the TB, and the resources may be reserved within at most 32 slots.

SUMMARY

The present disclosure provides a resource selection method and device based on inter-terminal assistance mechanism, and a storage medium.

A first aspect of embodiments of the present disclosure provides a resource selection method based on inter-terminal assistance mechanism applied to a first terminal, including receiving a transport block (TB); in response to determining that the TB is successfully received and determining that there is an unused reserved resource among reserved resources indicated by sidelink control information (SCI) carried in the TB by a second terminal, determining an unused reserved resource set based on the unused reserved resource; and performing a resource selection based on inter-terminal assistance mechanism according to the unused reserved resource set.

In an implementation, the resource selection method based on inter-terminal assistance mechanism further includes determining that the first terminal transmits a hybrid automatic repeat request acknowledge (HARQ ACK) response to the second terminal, and triggering the first terminal to perform the resource selection based on inter-terminal assistance mechanism according to the unused reserved resource set.

In an implementation, before triggering the first terminal to perform the resource selection based on inter-terminal assistance mechanism according to the unused reserved resource set, the resource selection method based on inter-terminal assistance mechanism further includes determining receipt of a resource assistance request transmitted by at least one third terminal.

In an implementation, performing the resource selection based on inter-terminal assistance mechanism according to the unused reserved resource set includes, after a first time slot interval following a time slot in which an HARQ ACK response is transmitted, determining a preferred resource set for an assistance resource set based on the unused reserved resource set, and including the unused reserved resource in the preferred resource set.

In an implementation, performing the resource selection based on inter-terminal assistance mechanism according to the unused reserved resource set includes, after a first time slot interval following a time slot in which an HARQ ACK response is transmitted, determining a non-preferred resource set for an assistance resource set based on the unused reserved resource set, and excluding the unused reserved resource from the non-preferred resource set.

In an implementation, performing the resource selection based on inter-terminal assistance mechanism according to the unused reserved resource set includes transmitting an assistance resource set to at least one third terminal after a second time slot interval following a time slot in which an HARQ ACK response is transmitted, the unused reserved resource set being included or not included in the assistance resource set.

A second aspect of embodiments of the present disclosure provides a resource selection method based on inter-terminal assistance mechanism applied to a second terminal, including transmitting a transport block (TB); in response to receiving, from a first terminal, a hybrid automatic repeat request acknowledge (HARQ ACK) response indicating that the TB is successfully received, and determining that there is an unused reserved resource among reserved resources indicated by sidelink control information (SCI) carried by the TB, determining a unused reserved resource set based on the unused reserved resource; and performing a resource selection based on inter-terminal assistance mechanism according to the unused reserved resource set.

In an implementation, performing the resource selection based on inter-terminal assistance mechanism according to the unused reserved resource set includes determining a preferred resource set for an assistance resource set based on the unused reserved resource set, indicating the preferred resource set for an assistance resource selection, and including the unused reserved resource in the preferred resource set.

In an implementation, performing the resource selection based on inter-terminal assistance mechanism according to the unused reserved resource set includes determining a non-preferred resource set for an assistance resource set based on the unused reserved resource set, and excluding the unused reserved resource from the non-preferred resource set.

In an implementation, performing the resource selection based on inter-terminal assistance mechanism according to the unused reserved resource set includes transmitting an assistance resource set to at least one third terminal, the unused reserved resource set being included or not included in the assistance resource set.

A third aspect of embodiments of the present disclosure provides a resource selection device based on inter-terminal assistance mechanism applied to a first terminal, including a receiving unit, configured to receive a transport block (TB), and a processing unit, configured to, in response to determining that the TB is successfully received and determining that there is an unused reserved resource among reserved resources indicated by sidelink control information (SCI) carried in the TB by a second terminal, determine an unused reserved resource set based on the unused reserved resource, and perform a resource selection based on inter-terminal assistance mechanism according to the unused reserved resource set.

In an implementation, the resource selection device based on inter-terminal assistance mechanism further includes a transmitting unit configured to transmit a hybrid automatic repeat request acknowledge (HARQ ACK) response to the second terminal, and the processing unit is further configured to determine that the first terminal transmits a hybrid automatic repeat request acknowledge (HARQ ACK) response to the second terminal, and trigger the first terminal to perform the resource selection based on inter-terminal assistance mechanism according to the unused reserved resource set.

In an implementation, the processing unit is further configured to, before triggering the first terminal to perform the resource selection based on inter-terminal assistance mechanism according to the unused reserved resource set, determine receipt of a resource assistance request transmitted by at least one third terminal.

In an implementation, performing the resource selection based on inter-terminal assistance mechanism according to the unused reserved resource set includes, after a first time slot interval following a time slot in which an HARQ ACK response is transmitted, determining a preferred resource set for an assistance resource set based on the unused reserved resource set, and including the unused reserved resource in the preferred resource set.

In an implementation, performing the resource selection based on inter-terminal assistance mechanism according to the unused reserved resource set includes:

after a first time slot interval following a time slot in which an HARQ ACK response is transmitted, determining a non-preferred resource set for an assistance resource set based on the unused reserved resource set, and excluding the unused reserved resource from the non-preferred resource set.

In an implementation, performing the resource selection based on inter-terminal assistance mechanism according to the unused reserved resource set includes transmitting an assistance resource set to at least one third terminal after a second time slot interval following a time slot in which an HARQ ACK response is transmitted, the unused reserved resource set being included or not included in the assistance resource set.

A fourth aspect of embodiments of the present disclosure provides a resource selection device based on inter-terminal assistance mechanism applied to a second terminal, including a transmitting unit, configured to transmit a transport block (TB); a receiving unit, configured to receive, from a first terminal, a hybrid automatic repeat request acknowledge (HARQ ACK) response indicating that the TB is successfully received; and a processing unit, configured to, in response to receiving, from the first terminal, the HARQ ACK response indicating that the TB is successfully received, and determining that there is an unused reserved resource among reserved resources indicated by SCI carried by the TB, determine an unused reserved resource set based on the unused reserved resource, and perform a resource selection based on inter-terminal assistance mechanism according to the unused reserved resource set.

In an implementation, the processing unit is configured to determine a preferred resource set for an assistance resource set based on the unused reserved resource set, indicate the preferred resource set for the assistance resource selection, and include the unused reserved resource in the preferred resource set.

In an implementation, the processing unit is configured to determine a non-preferred resource set for an assistance resource set based on the unused reserved resource set, and exclude the unused reserved resource from the non-preferred resource set.

In an implementation, the processing unit is configured to transmit an assistance resource set to at least one third terminal, the unused reserved resource set being included or not included in the assistance resource set.

A fifth aspect of embodiments of the present disclosure provides a resource selection device based on inter-terminal assistance mechanism, including a processor and a memory for storing executable instructions of the processor. The processor is configured to perform the resource selection method based on inter-terminal assistance mechanism according to the first aspect or any embodiment of the first aspect.

A sixth aspect of embodiments of the present disclosure provides a resource selection device based on inter-terminal assistance mechanism, including a processor and a memory for storing executable instructions of the processor. The processor is configured to perform the resource selection method based on inter-terminal assistance mechanism according to the second aspect or any embodiment of the second aspect.

A seventh aspect of embodiments of the present disclosure provides a storage medium having instructions stored thereon that, when being executed by a processor of a terminal, cause the terminal to perform the resource selection method based on inter-terminal assistance mechanism according to the first aspect or any embodiment of the first aspect.

An eighth aspect of embodiments of the present disclosure provides a storage medium having instructions stored thereon that, when being executed by a processor of a terminal, cause the terminal to perform the resource selection method based on inter-terminal assistance mechanism according to the second aspect or any embodiment of the second aspect.

It should be understood that the above general description and the following detailed descriptions are exemplary and explanatory only and do not limit the embodiments of the present disclosure.

BRIEF DESCRIPTION OF THE DRAWINGS

The accompanying drawings herein, which are incorporated into and form a part of the specification, illustrate embodiments consistent with the present disclosure, and are used, in conjunction with the specification, to explain the principles of the present disclosure.

DETAILED DESCRIPTION OF THE PREFERRED EMBODIMENTS

Figure 1:
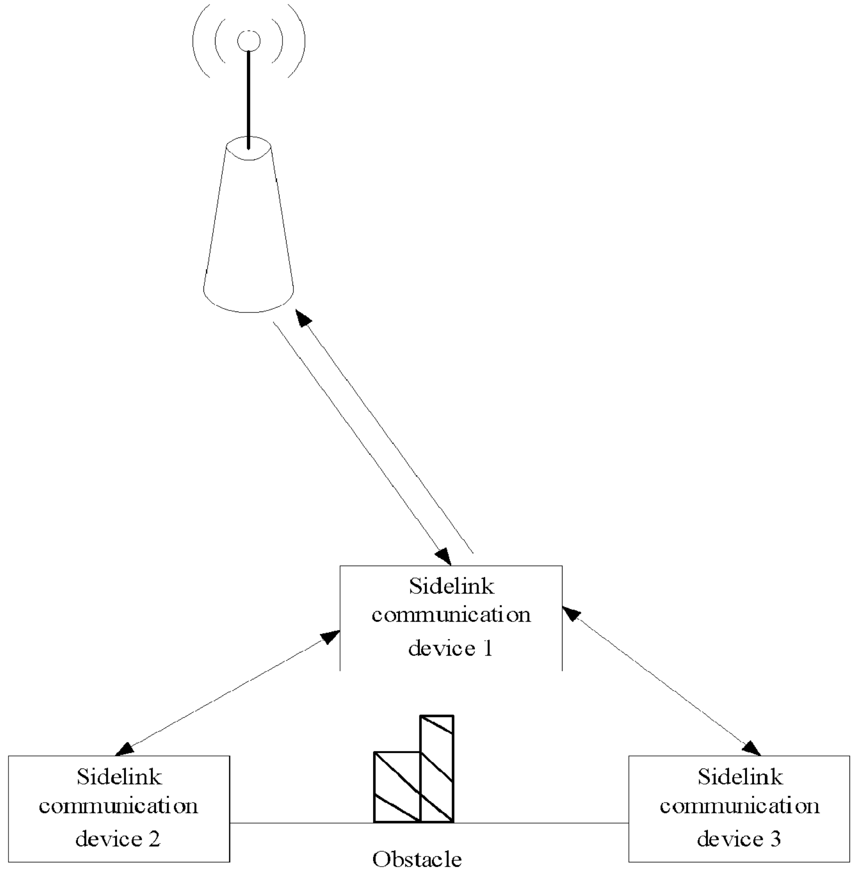
FIG. 1 illustrates a schematic diagram of a sidelink communication system according to an embodiment of the present disclosure.

Exemplary embodiments will be described herein in detail, examples of which are represented in the accompanying drawings. When the following description relates to the accompanying drawings, the same reference numerals in the different accompanying drawings indicate the same or similar elements unless otherwise indicated. The implementations described in the following exemplary embodiments do not represent all embodiments consistent with the present disclosure. Rather, they are only examples of devices and methods consistent with some aspects of the present disclosure as detailed in the appended claims.

An embodiment of the present disclosure provides a resource selection method based on inter-terminal assistance mechanism, which may be applied to a sidelink communication system shown in FIG. 1. Referring to FIG. 1, in a sidelink communication scenario between sidelink communication devices, a network device configures various transmission parameters for data transmission for a sidelink communication device 1. The sidelink communication device 1, a sidelink communication device 2, and a sidelink communication device 3 perform sidelink communication. An obstacle may exist between the sidelink communication device 2 and the sidelink communication device 3. The uplink and downlink are used for the communication between the network device and the sidelink communication device, and the sidelink is used for the communication between the sidelink communication devices.

In the present disclosure, the sidelink communication scenario between the sidelink communication devices may be a vehicle to everything (V2X) service scenario, where V represents a vehicle-mounted device and X represents any object that interacts with the vehicle-mounted device. Currently, X mainly includes a vehicle-mounted device, a handheld device, a traffic roadside infrastructure and a network. The V2X information interaction mode includes vehicle to vehicle (V2V) interaction, vehicle to infrastructure (V2I) interaction, vehicle to pedestrian (V2P) interaction, and vehicle to network (V2N) interaction.

With the development of the next-generation 5G mobile communication technology, the 3GPP Rel-16 uses the 5G NR technology to support new V2X communication services and scenarios, such as vehicles platooning, extended sensors, advanced driving, and remote driving. Generally, the 5G V2X sidelink can provide higher communication rate, shorter communication delay, and more reliable communication quality.

The sidelink communication scenario between the sidelink communication devices may also be a device to device (D2D) communication scenario. In an embodiment of the present disclosure, the sidelink communication device for sidelink communication may include various handheld devices, vehicle-mounted devices, wearable devices, computing devices, or other processing devices connected to a wireless modem which have wireless communication functions, and the sidelink communication device for sidelink communication may also include various forms of user equipment (UE), mobile station (MS), terminal (TM), terminal device (TD), terminal equipment and the like. For the convenience of description, for example, in an embodiment of the present disclosure, the sidelink communication device is described as a terminal hereinafter. The terminal and the UE are sometimes used interchangeably, but a person skilled in the art should understand that the meanings thereof are consistent with each other.

In the related art, the enhancement of NR sidelink is taken as a work item. The enhancement of NR sidelink may enhance transmission reliability and reduce delay. In the enhancement of NR sidelink, a resource reservation mechanism is employed for TB retransmission to enhance transmission reliability. In this regard, when the resource reservation mechanism is adopted to reserve resources for TB retransmission, generally, a transmitting device reserves resources for a receiving device, and indicates the reserved resource in sidelink control information (SCI) carried by the TB. In the resource reservation mechanism of R16, resources are reserved for TB retransmission, and each time the TB is transmitted, resources are reserved for the next TB transmission. Resources are reserved for at most two retransmissions at one transmission of the TB, and the resources may be reserved within at most 32 slots. However, for the terminal, the first transmission or the first retransmission of the TB may be successfully received, in which case the reserved resources remained are no longer used, resulting in a waste of resources.

For example, a UEB and a UEA are a pair of transmitting UE (TX UE) and receiving UE (Rx UE), which are in unicast communication. If the first transmission or first retransmission of TB of one UEB is successfully received by a receiving terminal UEA, the UEB does not use the remaining reserved resources. The other UEs than the UEB exclude the reserved resources of the UEB by decoding the SCI in the physical sidelink control channel (PSCCH) of the UEB during the resource sensing process, therefore the other UEs do not use the unused reserved resources, resulting in a waste of resources.

Figure 2:
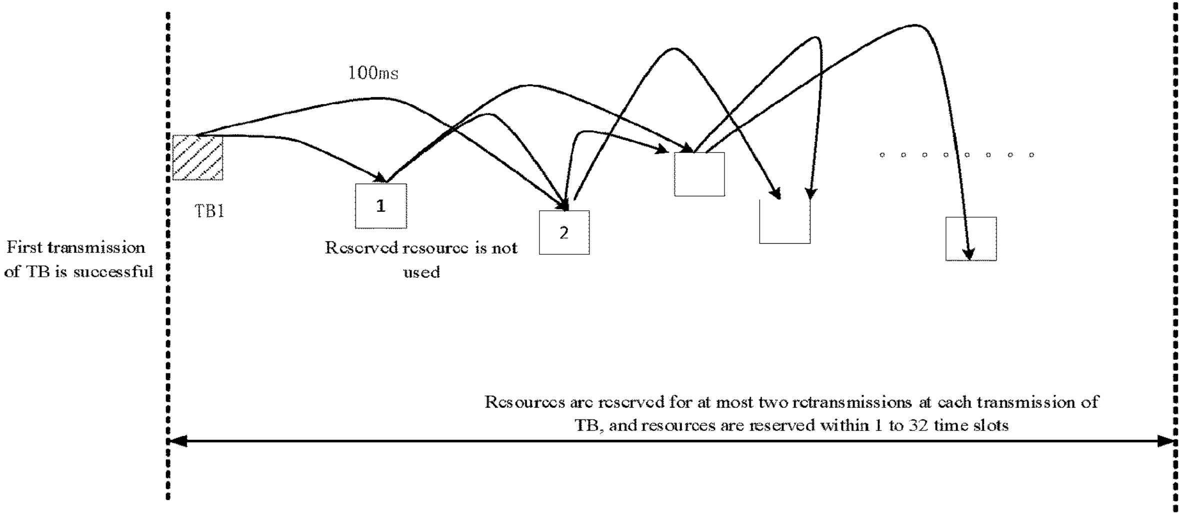
FIG. 2 illustrates a schematic diagram of an unused reserved resource which is remained in the case where a UEB first transmits a TB that is successfully received by a UEA.

FIG. 2 illustrates a schematic diagram of a remaining unused reserved resource in the case where a first transmission of a TB by UEB is successfully received by a UEA. Referring to FIG. 2, resources are reserved for at most two retransmissions at each transmission of TB, and the resources may be reserved within at most 32 slots. The first transmission of the TB is successful, i.e., the transmission is successful at the resource indicated by TB1, therefore the reserved resources 1 and 2 indicated by the SCI for TB1 are not used.

Figure 3:
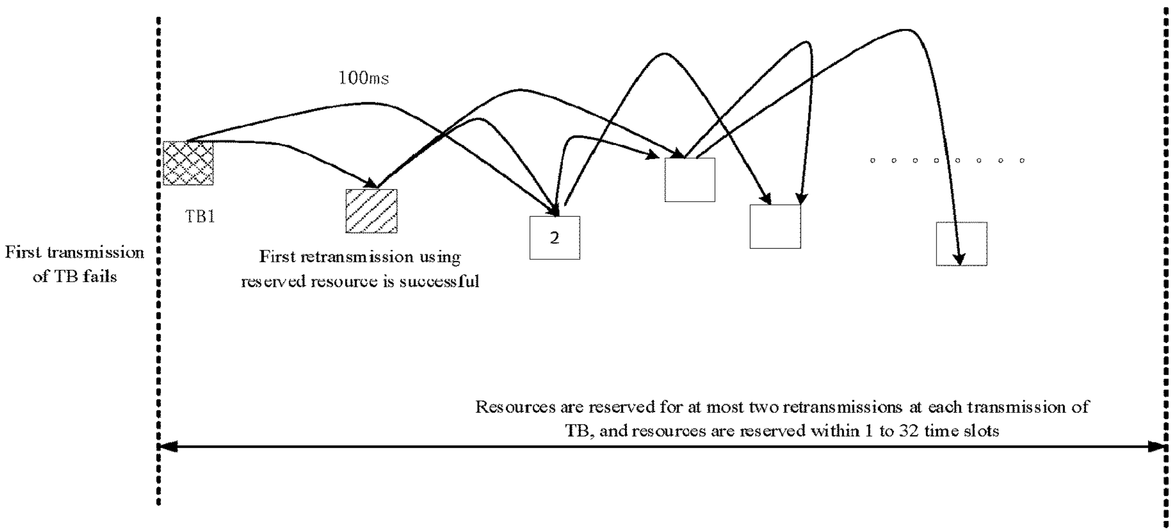
FIG. 3 illustrates a schematic diagram of an unused reserved resource which is remained in the case where a UEB first retransmits a TB that is successfully received by a UEA.

FIG. 3 illustrates a schematic diagram of a remaining unused reserved resource in the case where a first retransmission of a TB by UEB is successfully received by UEA. Referring to FIG. 3, resources are reserved for at most two retransmissions at each transmission of TB, and the resources may be reserved within at most 32 slots. When a first transmission of a TB fails, i.e., the transmission fails at the resource indicated by TB1, the retransmission is performed using the resource 1 reserved for TB1, the first retransmission using this reserved resource is successful, therefore the resource 2 reserved for TB1 is not used, and the subsequent reserved resource following the resource 2 is not used either.

Regarding the enhancement of NR Sidelink, the 3GPP working group reached the conclusion for the enhancement of Mode 2 resource selection that there is a need to investigate a resource selection mode based on inter-terminal assistance mechanism. In this mode, two terminals are specified, e.g., a UEA is an assistance UE for a UEB, and the UEB is a UE that needs to perform a resource selection for data it transmits (here, the UEA and the UEB are different from the UEA and the UEB as described previously). The UEA determines a resource set and transmits the same to the UEB, to assist the UEB to perform the resource selection by considering the resource set transmitted by the UEA.

In view of above, in an embodiment of the present disclosure, an unused reserved resource set is determined based on an unused resource in reserved resources according to the inter-terminal assistance mechanism, and a resource selection based on inter-terminal assistance mechanism is performed according to the unused reserved resource set in order to improve the resource utilization rate.

In an embodiment of the present disclosure, for the convenience of description, a terminal that transmitting a TB is referred to as a second terminal, and a terminal that receives a TB is referred to as a first terminal. The first terminal or second terminal may act as an assistance terminal to determine an unused reserved resource set, and to perform a resource selection based on inter-terminal assistance mechanism according to the unused reserved resource set to improve the resource utilization rate.

Figure 4:
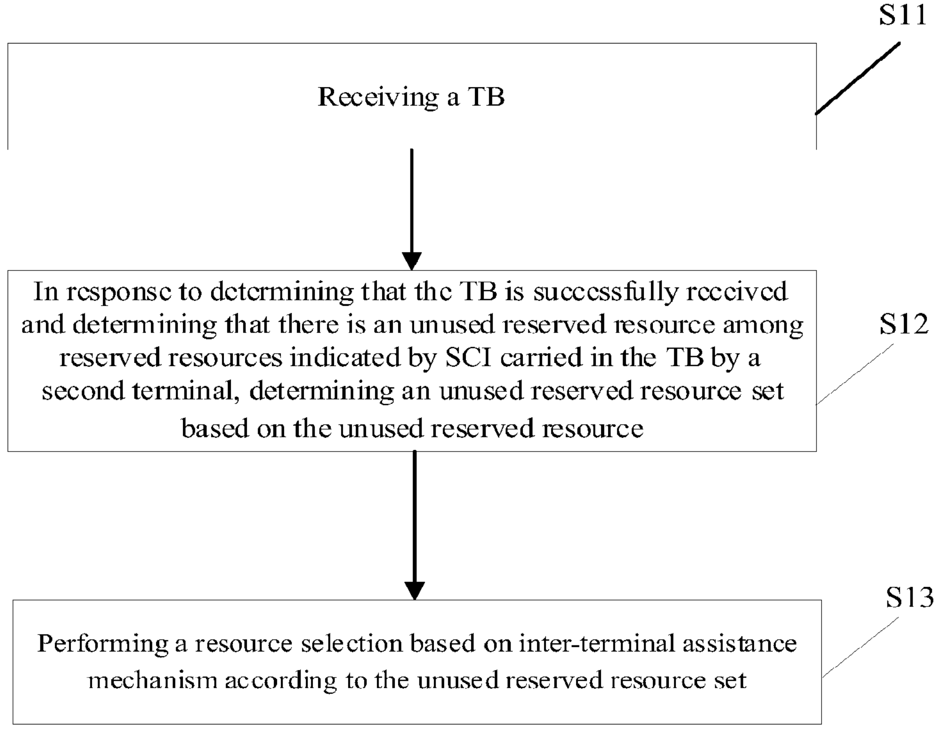
FIG. 4 is a flowchart of a resource selection method based on inter-terminal assistance mechanism according to an embodiment.

FIG. 4 is a flowchart of a resource selection method based on an inter-terminal assistance mechanism according to an embodiment. As shown in FIG. 4, the resource selection method based on the inter-terminal assistance mechanism is applied to a first terminal and includes the following steps.

In step S11, a TB is received.

In an embodiment of the present disclosure, the TB received by the first terminal may be transmitted by a second terminal. The first terminal and the second terminal are terminals that are in sidelink unicast communication.

The second terminal transmits the TB carrying a SCI to the first terminal, and indicates in the SCI a resource reserved for TB retransmission.

In step S12, in response to determining that the TB is successfully received and determining that there is an unused reserved resource among reserved resources indicated by a SCI carried in the TB by a second terminal, an unused reserved resource set is determined based on the unused reserved resource.

In an embodiment of the present disclosure, that the TB is successfully received may be understood to mean that both control information and data information corresponding to the TB are successfully decoded.

For example, a UEB and a UEA are a pair of a TX UE and an Rx UE in unicast communication. The UEA decodes, at the time slot in which the TB is received from the UEB, information fields in a first stage SCI of PSCCH, such as time resource assignment, frequency resource assignment, reservation period and the like, to obtain the resources reserved for this TB transmission. Then the UEA decodes the physical sidelink share channel (PSSCH) to determine whether the TB is correctly received or not. If the TB is failed to be received, the UEA transmits a NACK to the UEB, the UEB retransmits the TB, and the UEA will continue to decode the TB in a future time slot. If the TB is successfully received, the UEA determines the unused reserved resource set. The unused reserved resource set determined is referred to as setA in the following. The setA may be understood to be the resources reserved by the current TB transmission.

In step S13, resource selection based on inter-terminal assistance mechanism is performed according to the unused reserved resource set.

In an embodiment of the present disclosure, the first terminal receiving the TB determines the unused reserved resource among the reserved resources indicated by the SCI carried by the TB transmitted by the second terminal, and determines the unused reserved resource set based on the unused reserved resource. An assistance resource set is determined based on the unused reserved resource set, and a resource selection based on inter-terminal assistance mechanism is performed according to the unused reserved resource set, which enables the unused reserved resource to be available for a resource selection by other terminals using the inter-terminal assistance mechanism, so as to improve the resource utilization rate.

In an implementation, when the resource selection method based on the inter-terminal assistance mechanism in an embodiment of the present disclosure is performed by the first terminal, the first terminal may be triggered to perform the resource selection based on inter-terminal assistance mechanism according to the unused reserved resource set when determining that a condition for triggering the first terminal to perform the assistance mechanism-based resource selection is satisfied.

The condition of triggering the first terminal to perform the assistance mechanism-based resource selection may be a predefined condition. That is, after the predefined condition is satisfied, the UEA transmits assistance resource information to the UEB.

In an implementation, the condition of triggering the first terminal to perform the assistance mechanism-based resource selection may include that the first terminal transmits a hybrid automatic repeat request ACK (HARQ ACK) response to the second terminal, to trigger the first terminal to perform the resource selection based on inter-terminal assistance mechanism according to the unused reserved resource set. For example, the first terminal is triggered to start the inter-terminal assistance mechanism at a time slot when the first terminal transmits the HARQ ACK response to the second terminal.

Figure 5:
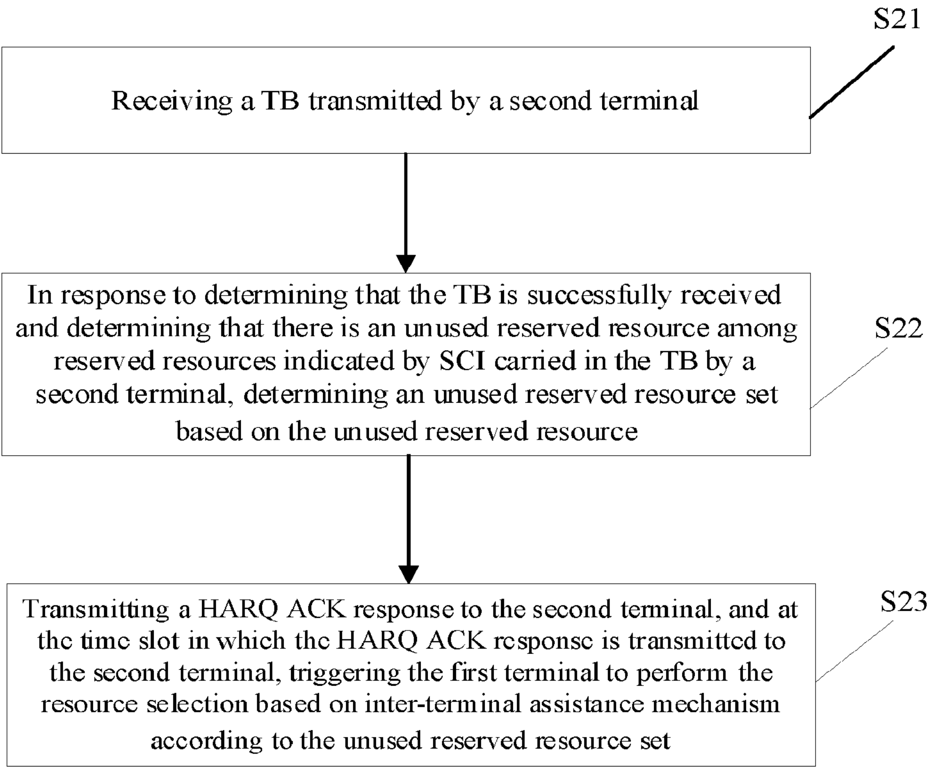
FIG. 5 is a flowchart of a resource selection method based on inter-terminal assistance mechanism according to an embodiment.

FIG. 5 is a flowchart of a resource selection method based on the inter-terminal assistance mechanism according to an embodiment. As shown in FIG. 5, the resource selection method based on the inter-terminal assistance mechanism is applied to a first terminal and includes:

step S21, receiving a TB transmitted by a second terminal;

step S22, in response to determining that the TB is successfully received and determining that there is an unused reserved resource among reserved resources indicated by SCI carried in the TB by a second terminal, determining an unused reserved resource set based on the unused reserved resource; and step S23, transmitting a HARQ ACK response to the second terminal, and at the time slot in which the HARQ ACK response is transmitted to the second terminal, triggering the first terminal to perform the resource selection based on inter-terminal assistance mechanism according to the unused reserved resource set.

In another implementation, an assistance request may be transmitted to the first terminal by another terminal different from the first terminal to request the first terminal to transmit assistance resource information. That is, the condition of triggering the first terminal to perform the assistance mechanism-based resource selection may include that the first terminal transmits a HARQ ACK response to the second terminal and determines receipt of a resource assistance request transmitted by an other terminal.

The other terminal is hereinafter referred to as a third terminal for convenience of description, and the third terminal is a different terminal from the first terminal and the second terminal.

Figure 6:
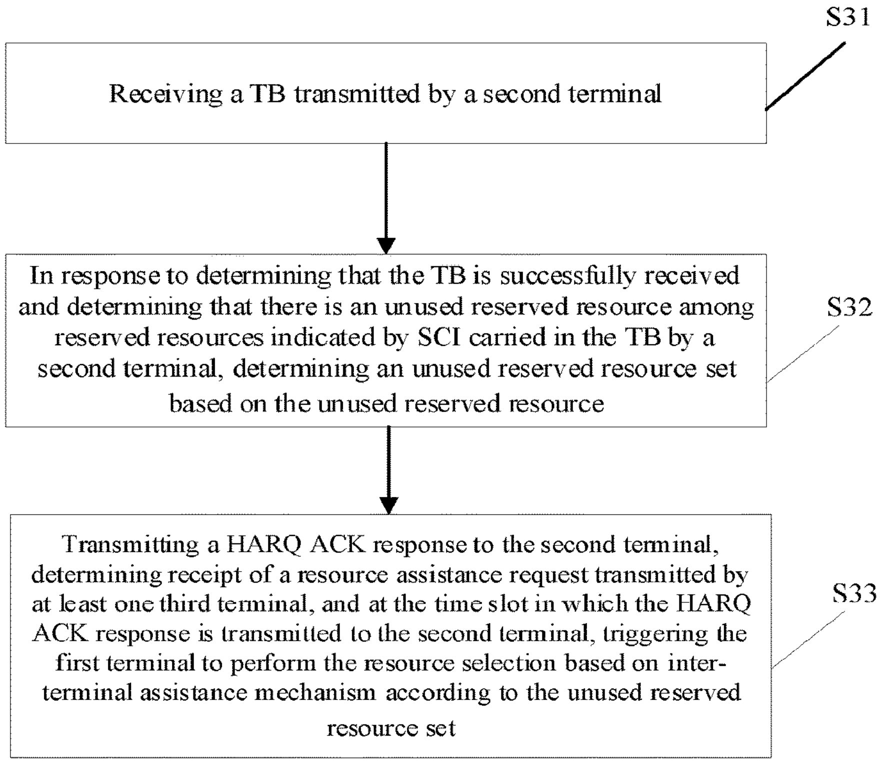
FIG. 6 is a flowchart of a resource selection method based on inter-terminal assistance mechanism according to an embodiment.

FIG. 6 is a flowchart of a resource selection method based on the inter-terminal assistance mechanism according to an embodiment. As shown in FIG. 5, the resource selection method based on the inter-terminal assistance mechanism is applied to a first terminal and includes:

step S31, receiving a TB transmitted by a second terminal;

step S32, in response to determining that the TB is successfully received and determining that there is an unused reserved resource among reserved resources indicated by SCI carried in the TB by a second terminal, determining an unused reserved resource set based on the unused reserved resource; and step S33, transmitting a HARQ ACK response to the second terminal, determining receipt of a resource assistance request transmitted by at least one third terminal, and at the time slot in which the HARQ ACK response is transmitted to the second terminal, triggering the first terminal to perform the resource selection based on inter-terminal assistance mechanism according to the unused reserved resource set.

In an embodiment of the present disclosure, after a certain period of time following triggering the first terminal to perform the resource selection based on inter-terminal assistance mechanism according to the unused reserved resource set, the resource selection based on inter-terminal assistance mechanism may be performed according to the unused reserved resource set.

In an implementation, after a first time slot interval following a time slot in which an HARQ ACK response is transmitted, the resource selection based on inter-terminal assistance mechanism is performed according to the unused reserved resource set. The first time slot interval may be a predefined time value.

In an embodiment of the present disclosure, when performing the resource selection based on inter-terminal assistance mechanism according to the unused reserved resource set, the first terminal may determine the assistance resource set on the one hand, and transmit the determined assistance resource set to the third terminal on the other hand.

In an embodiment of the present disclosure, when the resource selection based on inter-terminal assistance mechanism is performed according to the unused reserved resource set, a preferred resource set or a non-preferred resource set for an assistance resource set may be determined based on the unused reserved resource set.

In an implementation, after a first time slot interval following a time slot in which an HARQ ACK response is transmitted, a preferred resource set for an assistance resource set is determined based on the unused reserved resource set, and the unused reserved resource is included in the preferred resource set. That is, the preferred resource set in scheme 1 is determined, and the setA is included in the preferred resource set.

In another implementation, after a first time slot interval following a time slot in which an HARQ ACK response is transmitted, a non-preferred resource set for an assistance resource set is determined based on the unused reserved resource set, and the unused reserved resource is excluded from the non-preferred resource set. That is, the non-preferred resource set in scheme 1 is determined and the setA is excluded from that non-preferred resource set, i.e., the non-preferred resource set does not include the setA.

In an embodiment, after the assistance resource set is determined, the assistance resource set may be transmitted to at least one third terminal after a second time slot interval following a time slot in which an HARQ ACK response is transmitted. The third terminal is a terminal other than the first terminal and the second terminal, the unused reserved resource set is included or not included in the assistance resource set, and the second time slot interval is a predefined time value.

Figure 7:
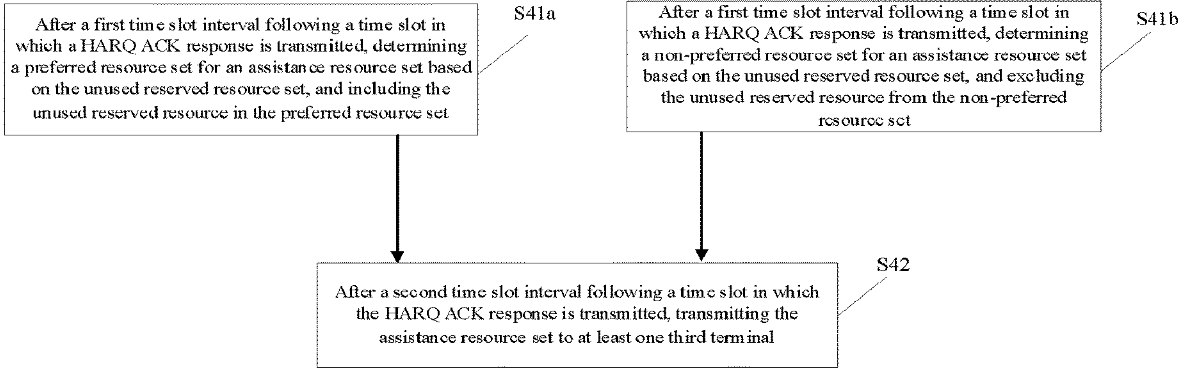
FIG. 7 is a flowchart of performing a resource selection based on inter-terminal assistance mechanism according to an unused reserved resource set according to an embodiment.

FIG. 7 is a flowchart of performing a resource selection based on inter-terminal assistance mechanism according to an unused reserved resource set according to an embodiment. As shown in FIG. 7, the performing the resource selection based on inter-terminal assistance mechanism according to the unused reserved resource set is applied to a first terminal and includes the following steps.

In step S41*a*, after a first time slot interval following a time slot in which an HARQ ACK response is transmitted, a preferred resource set for an assistance resource set is determined based on the unused reserved resource set, and the unused reserved resource is included in the preferred resource set.

In step S41*b*, after a first time slot interval following a time slot in which an HARQ ACK response is transmitted, a non-preferred resource set for an assistance resource set is determined based on the unused reserved resource set, and the unused reserved resource is excluded from the non-preferred resource set.

In an embodiment of the present disclosure, step S41*a* and step S41*b* may be performed optionally.

In step S42, after a second time slot interval following a time slot in which the HARQ ACK response is transmitted, the assistance resource set is transmitted to at least one third terminal.

The third terminal is a terminal other than the first terminal and the second terminal, the unused reserved resource set is included or not included in the assistance resource set, and the second time slot interval is a predefined time value.

In a resource selection method based on inter-terminal assistance mechanism according to an embodiment of the present disclosure, the second terminal may act as an assistance terminal to determine the unused reserved resource set and perform a resource selection based on inter-terminal assistance mechanism according to the unused reserved resource set to improve the resource utilization rate.

Figure 8:
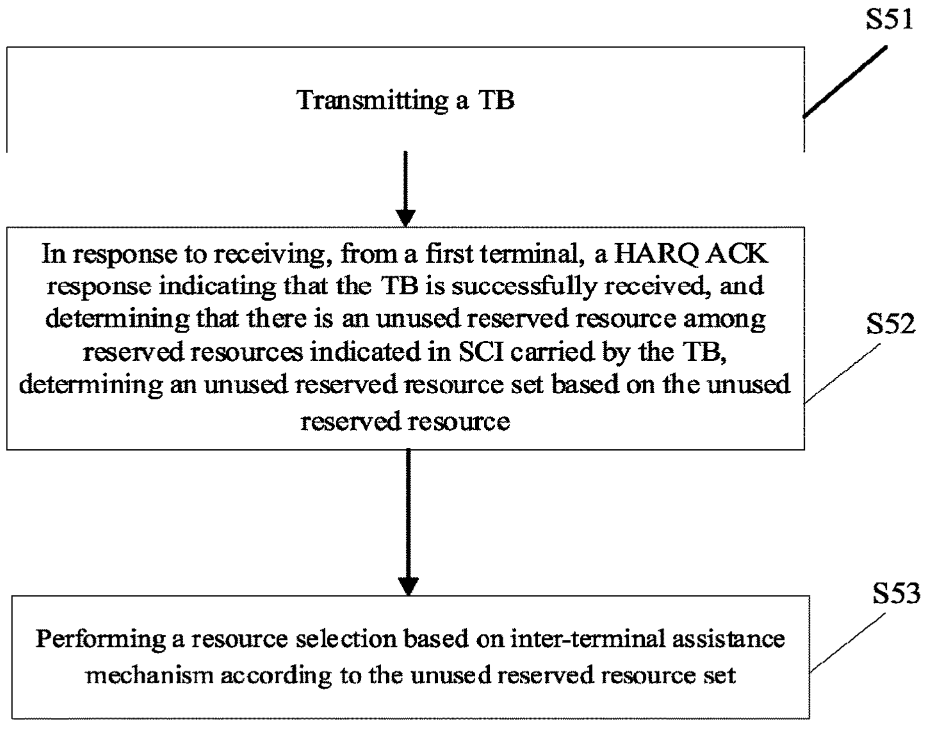
FIG. 8 is a flowchart of a resource selection method based on inter-terminal assistance mechanism according to an embodiment.

FIG. 8 is a flowchart of a resource selection method based on an inter-terminal assistance mechanism according to an embodiment. As shown in FIG. 8, the resource selection method based on the inter-terminal assistance mechanism is applied to a second terminal and includes the following steps.

In step S51, a TB is transmitted.

In an embodiment of the present disclosure, the second terminal transmits the TB to the first terminal. The first terminal and the second terminal are terminals that are in sidelink unicast communication.

The second terminal transmits the TB carrying a SCI to the first terminal, and indicates in the SCI a resource reserved for TB retransmission.

The first terminal receives the TB transmitted by the second terminal, and upon determining that the TB is successfully received, transmits to the second terminal a HARQ ACK response indicating that the TB is successfully received.

In step S52, in response to receiving, from the first terminal, the HARQ ACK response indicating that the TB is successfully received, and determining that there is an unused reserved resource among reserved resources indicated in SCI carried by the TB, an unused reserved resource set is determined based on the unused reserved resource.

In step S53, a resource selection based on inter-terminal assistance mechanism is performed according to the unused reserved resource set.

In an embodiment of the present disclosure, the second terminal transmitting the TB determines the unused reserved resource among the reserved resources indicated in the SCI carried by the TB, and determines the unused reserved resource set based on the unused reserved resource. The unused reserved resource set may be understood to be an assistance resource set. The resource selection based on inter-terminal assistance mechanism is performed based on the unused reserved resource set, which enables the unused reserved resource to be available for a resource selection by other terminals using the inter-terminal assistance mechanism, so as to improve the resource utilization rate.

In an embodiment of the present disclosure, when the resource selection based on inter-terminal assistance mechanism is performed based on the unused reserved resource set, a preferred resource set or a non-preferred resource set for the assistance resource set may be determined based on the unused reserved resource set.

In an implementation, the preferred resource set for the assistance resource set is determined based on the unused reserved resource set, and the unused reserved resource is included in the preferred resource set. That is, the preferred resource set in scheme 1 is determined, and the setA is included in the preferred resource set.

In another implementation, the non-preferred resource set for the assistance resource set is determined based on the unused reserved resource set, and the unused reserved resource is excluded from the non-preferred resource set. That is, the non-preferred resource set in scheme 1 is determined and the setA is excluded from that non-preferred resource set, i.e., the non-preferred resource set does not include the setA.

In an embodiment, after the assistance resource set is determined, the assistance resource set may be transmitted to at least one third terminal. The third terminal is a terminal other than the first terminal and the second terminal, and the unused reserved resource set is included or not included in the assistance resource set.

In the resource selection method based on the inter-terminal assistance mechanism in the above embodiment of the present disclosure, when there is the unused reserved resource among reserved resources indicated by SCI carried by the TB, the unused reserved resource set is determined based on the unused reserved resource, and the resource selection based on inter-terminal assistance mechanism is performed according to the unused reserved resource set, so that the unused reserved resource set may be used for transmission of other TBs, thereby improving the utilization rate of the reserved resources.

In an embodiment of the present disclosure, the resource selection method based on the inter-terminal assistance mechanism involved in the above embodiment is described hereinafter in conjunction with a practical application. The following embodiments are illustrated by taking the first terminal as UEA and the second terminal as UEB.

In an embodiment of the present disclosure, it first describes an implementation in which the UEA determines a resource that is reserved by the UEB but not used, determines an assistance resource set in consideration of the resource, and transmits the assistance resource set to one or more UEs other than the UEB for TB transmission, which mainly includes the following scheme.

In step 1, the UEA decodes, at the time slot (e.g., time slots n1/n3 in FIGS. 9 and 10) in which the TB is received from the UEB, information fields (time resource assignment, frequency resource assignment, and reservation period) in the first stage SCI of PSCCH to obtain the resources reserved for this TB transmission, and decodes the PSSCH to determine whether the TB is correctly received or not. If the TB is not received, it continues the step 1, and if the TB is successfully received, the UEA determines the setA (the setA is the resource reserved for this TB transmission) and step 2 is started.

In step 2, the UEA triggers the UEA to start the inter-UE assistance mechanism at the time slot (e.g., time slots n2/n3 in FIGS. 9 and 10) when the UEA feeds ACK to the UEB. Or the UEA feeds ACK to the UEB, and receives an assistance request from an other UE, and the UEA is triggered to start the inter-UE assistance mechanism.

In step 3, at the time slot when the UEA transmits ACK+t1, the assistance resource set is determined in consideration of the setA (t1 is a pre-defined time value).

In option 1, the preferred resource set in scheme 1 is determined (i.e., the preferred resource set includes the setA).

In option 2, the non-preferred resource set in scheme 1 is determined (i.e., the non-preferred resource set excludes the setA and does not include the setA).

In step 4, at the time slot when the UEA transmits ACK+t2, the UEA transmits the assistance resource set to one or more UEs other than the UEB for the resource selection of the one or more UEs (t2 is a pre-defined time value).

The resource selection process based on inter-terminal assistance mechanism according to the unused reserved resource set is described below in conjunction with the accompanying drawings.

Figure 9:
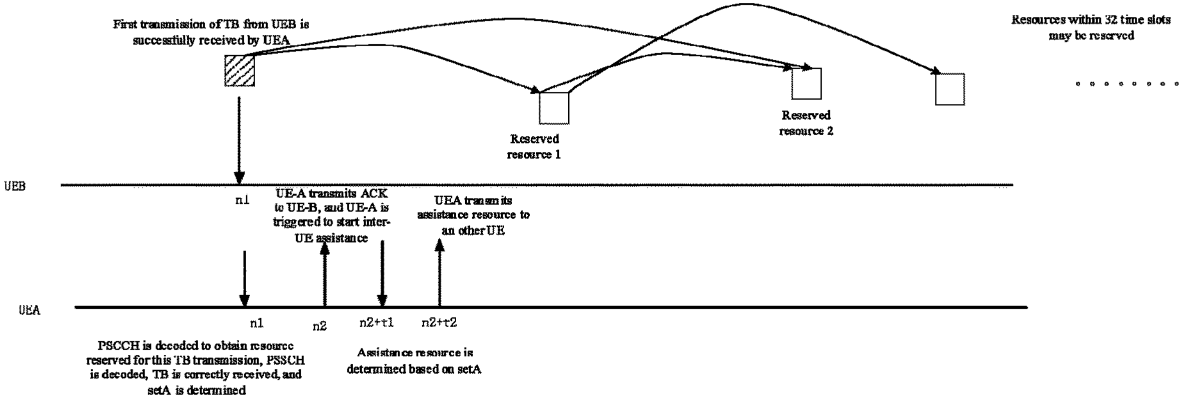
FIG. 9 is a schematic diagram of performing a resource selection based on inter-terminal assistance mechanism according to an unused reserved resource set in a case where a first transmission of a TB of a UEB is successfully received by a UEA according to an embodiment.

FIG. 9 is a schematic diagram of performing a resource selection based on inter-terminal assistance mechanism according to an unused reserved resource set in a case where a first transmission of a TB from a UEB is successfully received by a UEA according to an embodiment. Referring to FIG. 9, the UEB transmits the TB to the UEA, and the first transmission of the TB from the UEB is successfully received by the UEA at the time slot n1, i.e., the UEA decodes, at the time slot n1, the PSCCH to obtain the resource reserved for this TB transmission, and decodes the PSSCH. The UEA correctly receives the TB, and the UEA determines the setA. The UEA transmits the HARQ ACK response to the UEB at the time slot n2, and the UEA is triggered to start the inter-UE assistance. The UEA determines the assistance resource set based on the setA at the time slot n2+t1 and transmits the assistance resource set to other UEs at the time slot n2+t2.

Figure 10:
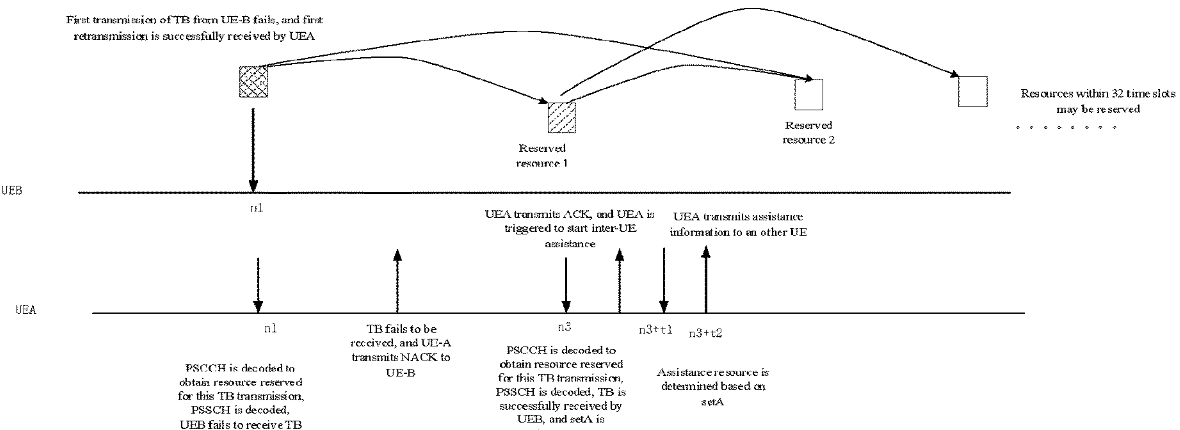
FIG. 10 is a schematic diagram of performing a resource selection based on inter-terminal assistance mechanism according to an unused reserved resource set in a case where a first retransmission of a TB of a UEB is successfully received by a UEA according to an embodiment.

FIG. 10 is a schematic diagram of performing a resource selection based on inter-terminal assistance mechanism according to an unused reserved resource set in a case where a first retransmission of a TB from a UEB is successfully received by a UEA according to an embodiment. Referring to FIG. 10, the UEB transmits the TB to the UEA, and the first transmission of the TB by the UEB fails, and is not successfully received by the UEA at the time slot n1, i.e., the UEA decodes the PSCCH at the time slot n1 to obtain the resource reserved for this TB transmission, and decodes the PSSCH. The UEA fails to receive the TB correctly. The UEA transmits the HARQ NACK response to the UEB. The first retransmission of the TB is successfully received by the UEA, i.e., the UEA decodes the PSCCH to obtain the resource reserved for this TB transmission, and decodes the PSSCH. The UEA correctly receives the TB, and the UEA determines the setA. The UEA transmits the HARQ ACK response to the UEB at the time slot n3, and the UEA is triggered to start the inter-UE assistance. The UEA determines the assistance resource based on the setA at the time slot n3+t1, and transmits the assistance resource to other UEs at the time slot n3+t2.

In an embodiment of the present disclosure, it describes an implementation in which the UEB determines a resource that is reserved by the UEB but not used, determines an assistance resource set in consideration of the resource, and transmits the assistance resource set to one or more UEs other than the UEB for TB transmission, which mainly includes the following scheme:

In step 1, the UEB transmits the TB to the UEA, the UEB receives the ACK feedback from the UEA, and the UEB takes the reserved resource for this TB transmission as the setA.

In step2, the UEB determines the assistance resource set based on the setA.

In option 1, the preferred resource set in scheme 1 is determined (i.e., the preferred resource set includes the setA).

In option 2, the non-preferred resource set in scheme 1 is determined (i.e., the non-preferred resource set excludes the setA and does not include the setA).

In step3, the UEB transmits the assistance resource set to one or more UEs other than the UEB for resource selection of the one or more UEs.

The implementation in which the UEB determines the resource reserved by the UEB but not used, determines the assistance resource set in consideration of the resource, and transmits the assistance resource set to one or more UEs other than the UEB for the TB transmission uses the unused resource for the assistance mechanism, which is similar to that of the UEA, and therefore it will not be illustrated herein by means of a diagram.

It is to be noted that a person skilled in the art may understand that the above various implementations/examples involved in the embodiments of the present disclosure may be used in conjunction with the foregoing embodiments or may be used independently. No matter they are used independently or in conjunction with the foregoing embodiments, the implementation principles thereof are similar. Some of the embodiments of the present disclosure are illustrated in an implementation in which they are used together; of course, a person skilled in the art may understand that such illustration is not a limitation of the embodiments of the present disclosure.

Based on the same concept, an embodiment of the present disclosure also provides a resource selection device based on inter-terminal assistance mechanism.

It is to be understood that the resource selection device based on inter-terminal assistance mechanism provided by an embodiment of the present disclosure includes a corresponding hardware structure and/or software module for performing respective functions, in order to achieve the above-described functions. In combination with the units and algorithmic steps of the various examples disclosed in the embodiments of the present disclosure, the embodiment of the present disclosure can be implemented in the form of hardware or a combination of hardware and computer software. Whether a particular function is performed as hardware or computer software driving hardware depends on the particular application and design constraints of the technical solution. A person skilled in the art may use a different manner for each particular application to implement the described functionality, but such implementation should not be considered as going beyond the scope of the technical solution of the embodiment of the present disclosure.

Figure 11:
FIG. 11 is a block diagram of a resource selection device based on inter-terminal assistance mechanism according to an embodiment.
Figure 11:
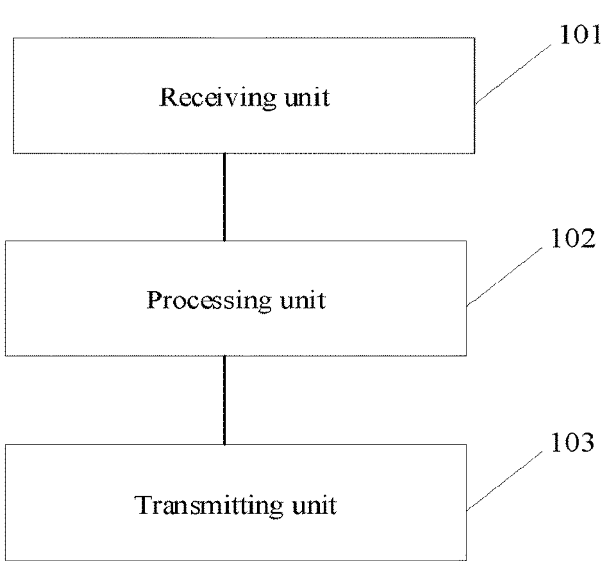

FIG. 11 is a block diagram of a resource selection device based on inter-terminal assistance mechanism according to an embodiment. Referring to FIG. 11, the resource selection device 100 based on inter-terminal assistance mechanism is applied to a first terminal, and includes a receiving unit 101 and a processing unit 102.

The receiving unit 101 is configured to receive a TB. The processing unit 102 is configured to, in response to determining that the TB is successfully received and determining that there is an unused reserved resource among reserved resources indicated by sidelink control information SCI carried in the TB by a second terminal, determine an unused reserved resource set based on the unused reserved resource, and perform a resource selection based on inter-terminal assistance mechanism according to the unused reserved resource set.

In an implementation, the resource selection device 100 based on inter-terminal assistance mechanism further includes a transmitting unit 103 configured to transmit a HARQ ACK response to the second terminal. The processing unit 102 is further configured to determine that the first terminal transmits a hybrid automatic repeat request acknowledge HARQ ACK response to the second terminal, and trigger the first terminal to perform the resource selection based on inter-terminal assistance mechanism according to the unused reserved resource set.

In an implementation, the processing unit 102 is further configured to, before triggering the first terminal to perform the resource selection based on inter-terminal assistance mechanism according to the unused reserved resource set, determine receipt of a resource assistance request transmitted by at least one third terminal.

In an implementation, the processing unit 102 is further configured to, after a first time slot interval following a time slot in which an HARQ ACK response is transmitted, determine a preferred resource set for an assistance resource set based on the unused reserved resource set, and include the unused reserved resource in the preferred resource set.

In an implementation, the processing unit 102 is further configured to, after a first time slot interval following a time slot in which an HARQ ACK response is transmitted, determine a non-preferred resource set for an assistance resource set based on the unused reserved resource set, and exclude the unused reserved resource from the non-preferred resource set.

In an implementation, the processing unit 102 is further configured to, transmit an assistance resource set to at least one third terminal after a second time slot interval following a time slot in which an HARQ ACK response is transmitted, the unused reserved resource set being included or not included in the assistance resource set.

Figure 12:
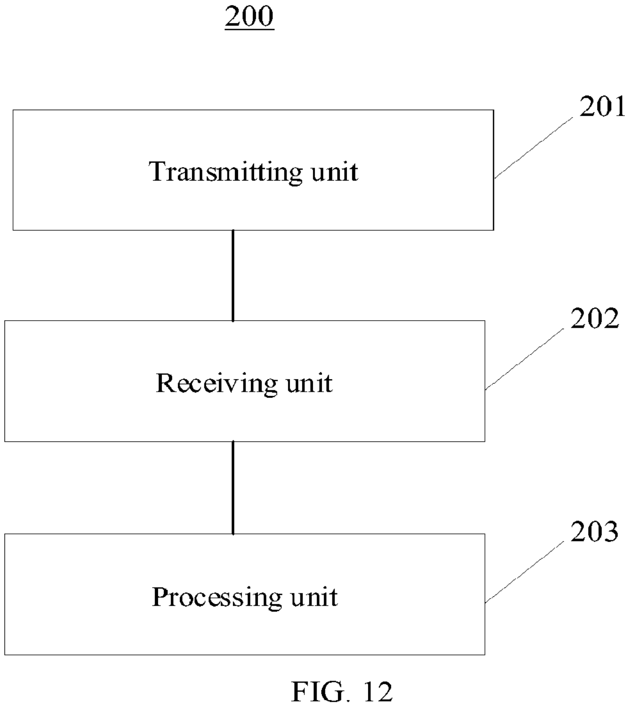
FIG. 12 is a block diagram of a resource selection device based on inter-terminal assistance mechanism according to an embodiment.

FIG. 12 is a block diagram of a resource selection device based on inter-terminal assistance mechanism according to an embodiment. Referring to FIG. 12, the resource selection device 200 based on the inter-terminal assistance mechanism is applied to a second terminal, and includes a transmitting unit 201, a receiving unit 202, and a processing unit 203.

The transmitting unit 201 is configured to transmit a TB. The receiving unit 202 is configured to receive, from a first terminal, a HARQ ACK response indicating that the TB is successfully received. The processing unit 203 is configured to, in response to receiving, from the first terminal, the HARQ ACK response indicating that the TB is successfully received, and determining that there is an unused reserved resource among reserved resources indicated by SCI carried by the TB, determine an unused reserved resource set based on the unused reserved resource, and perform a resource selection based on inter-terminal assistance mechanism according to the unused reserved resource set.

In an implementation, the processing unit 203 is configured to determine a preferred resource set for an assistance resource set based on the unused reserved resource set, indicate the preferred resource set for the assistance resource selection, and include the unused reserved resource in the preferred resource set.

In an implementation, the processing unit 203 is configured to determine a non-preferred resource set for an assistance resource set based on the unused reserved resource set, and exclude the unused reserved resource from the non-preferred resource set.

In an implementation, the processing unit 203 is configured to transmit an assistance resource set to at least one third terminal, the unused reserved resource set being included or not included in the assistance resource set.

With respect to the device in the above embodiments, the specific manner in which each module performs an operation has been described in detail in the embodiments relating to the method, which will not be described in detail herein.

Figure 13:
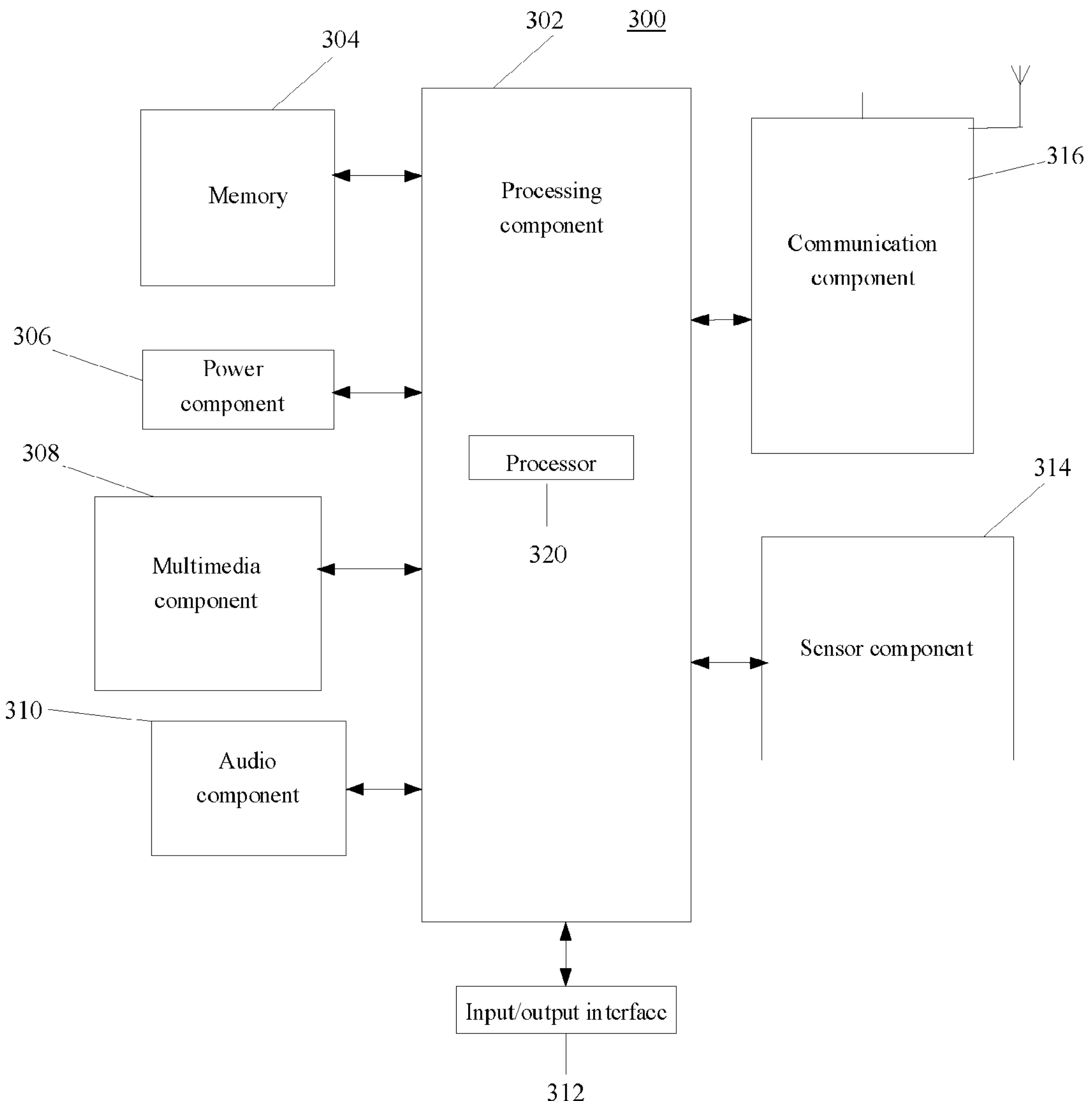
FIG. 13 is a block diagram of a device for a resource selection based on inter-terminal assistance mechanism according to an embodiment.

FIG. 13 is a block diagram of a device 300 for a resource selection based on inter-terminal assistance mechanism according to an embodiment. For example, the device 300 may be a mobile phone, a computer, a digital broadcasting terminal, a messaging device, a game console, a tablet device, a medical device, a fitness device, a personal digital assistant, or the like.

Referring to FIG. 13, the device 300 may include one or more of a processing component 302, a memory 304, a power component 306, a multimedia component 308, an audio component 310, an input/output (I/O) interface 312, a sensor component 314, and a communication component 316.

The processing component 302 generally controls the overall operations of the device 300, such as operations associated with display, telephone calls, data communications, camera operations, and recording operations. The processing component 302 may include one or more processors 320 to execute instructions to complete all or part of the steps of the foregoing method. In addition, the processing component 302 may include one or more modules to facilitate interaction between the processing component 302 and other components. For example, the processing component 302 may include a multimedia module to facilitate the interaction between the multimedia component 308 and the processing component 302.

The memory 304 is configured to store various types of data to support the operation at the device 300. Examples of these data include instructions for any application or method operating on the device 300, contact data, phone book data, messages, pictures, videos and the like. The memory 304 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 306 provides power to various components of the device 300. The power component 306 may include a power management system, one or more power supplies, and other components associated with generating, managing, and distributing power for the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 308 includes a front camera and/or a rear camera. When the device 300 is in an operation mode, such as a shooting mode or a video mode, the front camera and/or the rear camera can receive external multimedia data. Each front camera and rear camera may be a fixed optical lens system or have focal length and optical zoom capabilities.

The audio component 310 is configured to output and/or input audio signals. For example, the audio component 310 includes a microphone (MIC), and when the device 300 is in an operation mode, such as a call mode, a recording mode, and a voice recognition mode, the microphone is configured to receive an external audio signal. The received audio signal can be further stored in the memory 304 or sent via the communication component 316. In some embodiments, the audio component 310 further includes a speaker for outputting audio signals.

The I/O interface 312 provides an interface between the processing component 302 and a peripheral interface module. The above-mentioned peripheral interface module may be a keyboard, a click wheel, a button, and the like. These buttons may include but are not limited to home button, volume button, start button, and lock button.

The sensor component 314 includes one or more sensors for providing the device 300 with various aspects of state evaluation. For example, the sensor component 314 can detect the on/off status of the device 300 and the relative positioning of components. For example, the component is a display and keypad of the device 300. The sensor component 314 can also detect the position change of the device 300 or a component of the device 300, the presence or absence of contact between the user and the device 300, the orientation or acceleration/deceleration of the device 300, and the temperature change of the device 300. The sensor component 314 may include a proximity sensor configured to detect the presence of nearby objects when there is no physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 can access a wireless network based on any communication standard, such as WiFi, 2G, 3G, 4G, 5G or a combination thereof. In an embodiment, the communication component 316 receives a broadcast signal or broadcast related information from an external broadcast management system via a broadcast channel. In an embodiment, the communication component 316 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 300 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 304 including instructions, and the instructions may be executed by the processor 320 of the device 300 to complete the foregoing method. For example, the non-transitory computer-readable storage medium may be ROM, random access memory (RAM), CD-ROM, magnetic tape, floppy disk, optical data storage device and the like.

It is further understood that the term “plurality” in the present disclosure means two or more, and other quantifiers are similar. The term “and/or”, describing the association of associated objects, indicates that three relationships can exist, for example, A and/or B, which can indicate the presence of A alone, A and B together, and B alone. The character “/” generally indicates an “or” relationship between the preceding and following associated objects. The singular forms “a”, “said” and “the” are also intended to include plural forms, unless the context clearly indicates otherwise.

It is further understood that the terms “first”, “second” and the like are used to describe a variety of information, but that such information should not be limited to these terms. These terms are only used to distinguish information of the same type from one another and do not indicate a particular order or level of importance. In fact, the expressions “first” and “second” may be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A resource selection method based on inter-terminal assistance mechanism, performed by a first terminal, comprising:

receiving a transport block (TB) from a second terminal;

in response to determining that the TB is successfully received and determining that there is an unused reserved resource indicated by sidelink control information (SCI) carried in the TB by the second terminal, determining an unused reserved resource set based on the unused reserved resource; and performing a resource selection based on inter-terminal assistance mechanism according to the unused reserved resource set, wherein performing the resource selection based on the inter-terminal assistance mechanism according to the unused reserved resource set comprises:

after a first time slot interval following a time slot in which the first terminal transmits an HARQ ACK response to the second terminal, determining, based on the unused reserved resource set, a preferred assistance resource set or a non-preferred assistance resource set as an assistance resource set, wherein the preferred assistance resource set comprises the unused reserved resource, and the non-preferred assistance resource set does not comprise the unused reserved resource; and after a second time slot interval following a time slot in which the first terminal transmits the HARQ ACK response to the second terminal, transmitting the assistance resource set to at least one third terminal, wherein the at least one third terminal is a terminal different from the first terminal and the second terminal, and the first terminal is an assistance terminal for the at least one third terminal under the inter-terminal assistance mechanism, wherein the method further comprising:

receiving a resource assistance request transmitted by the at least one third terminal wherein the resource assistance request is configured to trigger the first terminal to determine the assistance resource set for the at least one third terminal.

2. The resource selection method based on inter-terminal assistance mechanism according to claim 1, further comprising:

determining that the first terminal transmits the HARQ ACK response to the second terminal, and performing the resource selection based on the inter-terminal assistance mechanism according to the unused reserved resource set.

3. A nonvolatile storage medium having instructions stored thereon that, when being executed by a processor of a terminal, cause the terminal to implement the resource selection method based on inter-terminal assistance mechanism according to claim 1.

4. A resource selection method based on inter-terminal assistance mechanism, performed by a second terminal, comprising:

transmitting a transport block (TB) to a first terminal;

in response to receiving, from the first terminal, a hybrid automatic repeat request acknowledge (HARQ ACK) response indicating that the TB is successfully received, and determining that there is an unused reserved resource indicated by sidelink control information (SCI) carried by the TB, determining an unused reserved resource set based on the unused reserved resource;

performing a resource selection based on the inter-terminal assistance mechanism according to the unused reserved resource set, performing the resource selection based on the inter-terminal assistance mechanism according to the unused reserved resource set comprises:

determining, based on the unused reserved resource set, a preferred assistance resource set or a non-preferred assistance resource set as an assistance resource set, wherein the preferred assistance resource set comprises the unused reserved resource, and the non-preferred assistance resource set does not comprise the unused reserved resource; and transmitting the assistance resource set to at least one third terminal, wherein the at least one third terminal is a terminal different from the first terminal and the second terminal and the second terminal is an assistance terminal for the at least one third terminal under the inter-terminal assistance mechanism, wherein the method further comprising:

receiving a resource assistance request transmitted by the at least one third terminal, wherein the resource assistance request is configured to trigger the second terminal to determine the assistance resource set for the at least one third terminal.

5. A resource selection device based on inter-terminal assistance mechanism, applied to a second terminal, comprising:

a processor; and a memory for storing executable instructions of the processor that, when being executed by the processor, cause the second terminal to implement the resource selection method based on inter-terminal assistance mechanism according to claim 4.

6. A nonvolatile storage medium having instructions stored thereon that, when being executed by a processor of a terminal, cause the terminal to implement the resource selection method based on inter-terminal assistance mechanism according to claim 4.

7. A resource selection device based on inter-terminal assistance mechanism, applied to a first terminal, comprising:

a processor; and a memory for storing executable instructions of the processor that, when being executed by the processor, cause the first terminal to implement:

receiving a transport block (TB) from a second terminal;

in response to determining that the TB is successfully received and determining that there is an unused reserved resource indicated by sidelink control information (SCI) carried in the TB by the second terminal, determining an unused reserved resource set based on the unused reserved resource; and performing a resource selection based on inter-terminal assistance mechanism according to the unused reserved resource set, wherein performing the resource selection based on the inter-terminal assistance mechanism according to the unused reserved resource set comprises:

after a first time slot interval following a time slot in which the first terminal transmits an HARQ ACK response to the second terminal, determining, based on the unused reserved resource set, a preferred assistance resource set or a non-preferred assistance resource set as an assistance resource set, wherein the preferred assistance resource set comprises the unused reserved resource, and the non-preferred assistance resource set does not comprise the unused reserved resource; and after a second time slot interval following a time slot in which the first terminal transmits the HARQ ACK response to the second terminal, transmitting the assistance resource set to at least one third terminal, wherein the at least one third terminal is a terminal different from the first terminal and the second terminal, and the first terminal is an assistance terminal for the at least one third terminal under the inter-terminal assistance mechanism, wherein the first terminal is caused to further implement:

receiving a resource assistance request transmitted by the at least one third terminal, wherein the resource assistance request is configured to trigger the first terminal to determine the assistance resource set for the at least one third terminal.

8. The resource selection device based on inter-terminal assistance mechanism according to claim 7, wherein the first terminal is caused to further implement:

determining that the first terminal transmits the HARQ ACK response to the second terminal, and performing the resource selection based on the inter-terminal assistance mechanism according to the unused reserved resource set.

* * * * *